United States Patent [19]

Sendov et al.

[11] 4,160,647
[45] Jul. 10, 1979

[54] CONTINUOUS OPERATION EXTRACTOR

[75] Inventors: Stoyan H. Sendov, Sofia; Stoyan I. Evtimov, Vidin; Ivan A. Nikolov, Vidin; Ivan A. Kuklin, Vidin; Mircho G. Mirchev, Vidin; Nicolas S. Dimov, Vidin, all of Bulgaria

[73] Assignee: Chimkombinat, Vidin, Bulgaria

[21] Appl. No.: 876,152

[22] Filed: Feb. 8, 1978

Related U.S. Application Data

[63] Continuation of Ser. No. 710,633, Aug. 2, 1976, abandoned.

[30] Foreign Application Priority Data

Aug. 2, 1975 [BG] Bulgaria .................................. 30713

[51] Int. Cl.² ............................................ B01D 11/02
[52] U.S. Cl. .................... 422/106; 196/14.52; 422/261; 422/279
[58] Field of Search ................... 23/270 R, 267 S, 272, 23/270.5 T, 270.5 R; 202/168–170; 203/43–46; 196/14.52

[56] References Cited

U.S. PATENT DOCUMENTS

| 2,037,319 | 4/1936 | Fenske et al. | 196/14.52 |
| 2,132,151 | 10/1938 | Fenske et al. | 196/14.52 |
| 2,150,608 | 3/1939 | Olier | 422/274 |
| 3,687,819 | 8/1972 | Levin | 202/169 |
| 3,689,226 | 9/1972 | Stoddard | 422/262 |

*Primary Examiner*—Wilbur L. Bascomb, Jr.
*Attorney, Agent, or Firm*—Karl F. Ross

[57] ABSTRACT

A continuous-operation extractor for the solvent extraction of low-molecular weight compounds for a solid, e.g. granular polyamide, comprises an upright housing formed internally with vertically extending pipes beneath each of which a steam nozzle opens. Deflectors are provided above the upper ends of each pipe and an overflow conducts the solids downwardly from one extractor stage to the next. A solid inlet communicates with the uppermost extraction stage and is provided with inclined perforated baffles while below the lowermost stage a float-controlled valve regulates the steam inlet.

3 Claims, 3 Drawing Figures

CONTINUOUS OPERATION EXTRACTOR

This is a continuation of application Ser. No. 710,633, filed Aug. 2, 1976 and now abandoned.

FIELD OF THE INVENTION

This invention relates to an extractor with continuous action for the extraction of substances from solid materials by means of a solvent which can be used in the chemical industry, for example, for extracting low-molecular compounds from granulated polyamide with water.

BACKGROUND OF THE INVENTION

Extractors with continuous action are known, which comprise several vertical pipes, connected parallely and arranged in a circle, enclosed by a common casing for heating with steam. The solid material is distributed by gravity in the different pipes and moves downwardly in them in the form of a dense layer. The solvent is fed into the bottom portion of the pipes and flows upwardly out from their upper portion through individual manually controlled valves.

The drawbacks of this type of extractor are the low efficiency of the mass-exchange process because of the lack of mixing of the liquid and solid phases and the difficulty maintaining an equal discharge of solvent through each pipe.

Sectional extractor is known, in which several working sections are disposed one above the other, forming a vertical column, ending on the top with a head. Each section represents a casing-pipe element having a bottom in which there are arranged nozzles for introducing gas upwardly into an array of vertical pipes, which provides a pneumatic mixing of the phases. The phases without gas bubbles move downwards along the outside of the pipes, under which there are no nozzles. The space between the pipes in each section is used for separating the phases. This design is suitable for liquid-liquid extraction, but it cannot be used for solid substances.

OBJECTS OF THE INVENTION

It is, therefore, a general object of the present invention to avoid the drawbacks of the known extractors and to provide an extractor with continuous action, which can provide an intensive mass exchange process, high productivity and reliable operation.

SUMMARY OF THE INVENTION

These objects are achieved by providing in the upper end of the extractor head, an inlet pipe for the solid material formed with inclined perforated plates and a throttling valve for the discharge of the gas. Laterally to the head there is provided an outlet pipe connection for the solvent. Each of a plurality of sections arranged below the head is provided with an overflow, and in the base of the extractor there is disposed under the lowest section a float, which is connected to a regulating valve, provided laterally to the base, which is formed at the bottom end with an outlet pipe connection for the solid phase and with an inlet pipe connection for the solvent.

The three-phase fluidized layer with internal repeated circulation created inside each section of the extractor provides conditions for periodic intensive mixing of the material with the solvent at a considerable relative velocity, which is a prerequisite for intensive mass exchange and uniformity of the concentration of the solid particles. The design is reliable in operation a requires a small energy consumption.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
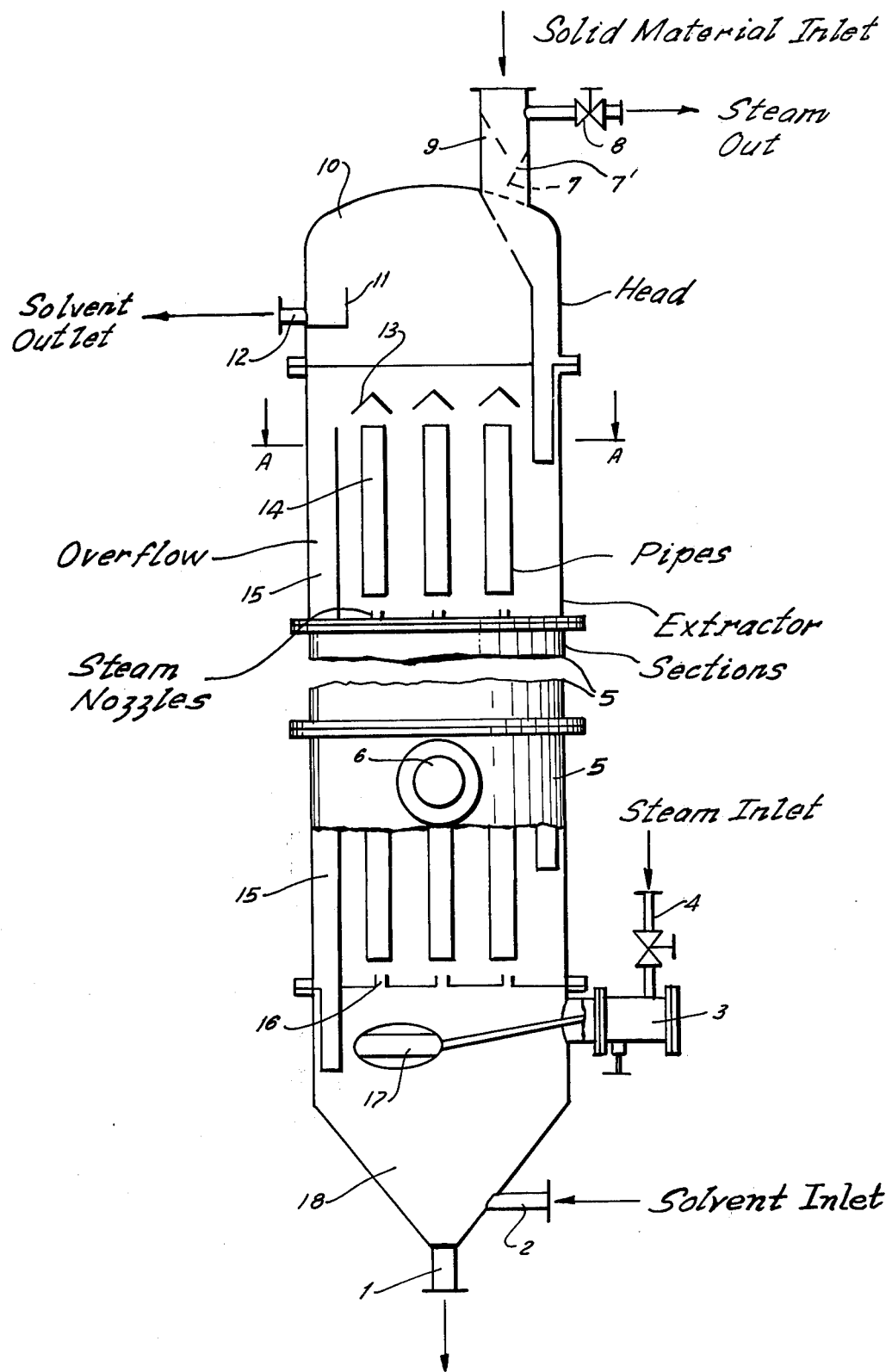
FIG. 1 is a diagrammatic vertical partial cross-sectional view of the extractor.

The extractor comprises a base 18, provided with pipe connections 1 and 2 and a regulating valve 3, connected to a float 17. To the base 18 there are connected hermetically by means of flanges several sections 5, each of which comprises hatches 6 and vertical pipes 14 under which in alignment therewith there are arranged upwardly facing nozzles 16, with baffle plates 13 arranged thereabove. Over the uppermost section 5 there is disposed the head 10 of the column. It is provided with an overflow 11, an outlet pipe connection 12, an inlet pipe 9 formed with inclined surfaces 7 arranged therein and formed with perforations 7' and a throttling valve 8. The pipes 14 can be of differently shaped cross-section.

In operation the solid material enters through the inlet pipe 9, flows down over the inclined perforated surfaces 7 and is heated by the exhausted steam flowing past surfaces 7 and out of the throttling valve 8. The material then enters the uppermost section 5, where it is mixed intensively by the steam-gas jet coming out of the nozzles 16 into the pipes 14 and encountering the baffles 13, the material then passing through the overflow 15 into the next lower section. After passing through all sections, it flows down into the conical bottom of base 18 and is discharged through pipe connection 1.

The solvent is introduced through pipe connection 2 in the base 18. It is heated to the temperature of saturation of the steam, entering through inlet connection 4 and regulating valve 3. The heated solvent flows upwardly through the various overflows 15 in the column.

Within the uppermost section 5, the steam jets from nozzles 16 induce an intensive circulation of the solids and solvent, rising from the next lower section through the overflow 15, within and around the pipes 14. The solids pass downwardly through the overflow 15 and the process is repeated in each successively lower section with the solvent being ultimately discharged through the outlet 12 and the solids through the outlet 1.

Figure 2:
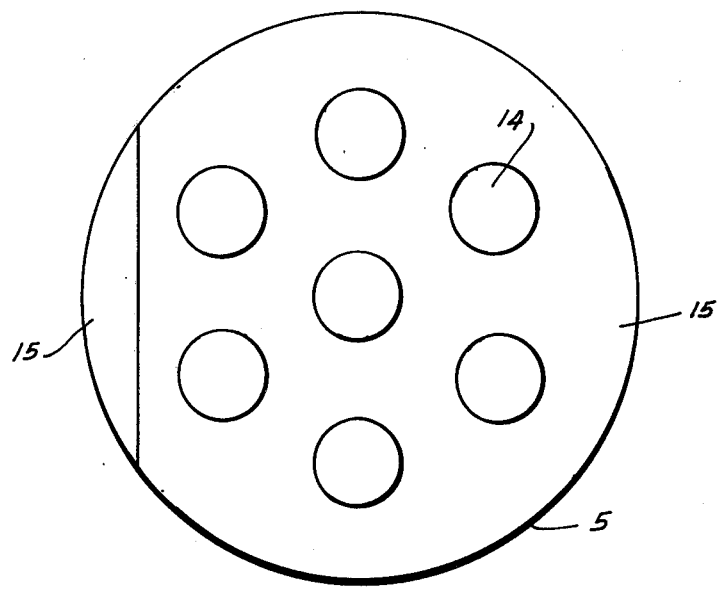
FIG. 2 is a cross-sectional view taken along line A—A of FIG. 1.
Figure 3:
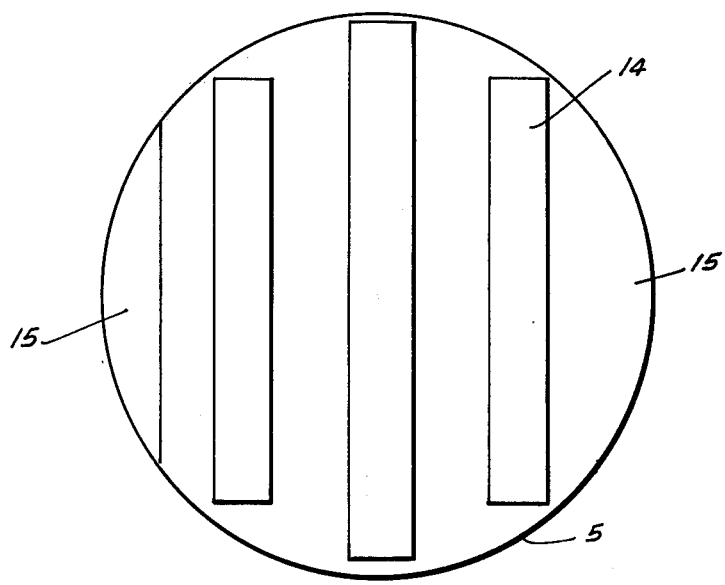
FIG. 3 is a cross-sectional view similar to FIG. 2 of a section with rectangular pipes.

The float 17 and the valve 3 together control the rate of steam introduction to maintain a steam-gas layer in chamber 18 above the liquid level therein. This, in turn, controls the pressure at the nozzles 16. FIGS. 2 and 3 show that the pipes 14 can have circular or rectangular cross sections.

What we claim is:

1. A continuous-operation extractor for the solvent extraction of solids, comprising:
   a column formed with a discharge chamber at its bottom, a plurality of extractor sections disposed one above another above said chamber, and a head formed above the uppermost section;

a solids inlet pipe above said head and communicating therewith, formed internally with a plurality of downwardly and inwardly inclined perforated surfaces over which solids can pass into said head, said inlet pipe being further formed above said surfaces with a steam outlet provided with a throttle valve;

a plurality of spaced-apart mutually parallel upright pipes in each of said sections, each of said sections being formed with respective nozzles opening below each of said pipes and respective baffles spaced above each of said pipes and of inverted V-cross section whereby jets emerging from said nozzles induce a circulation of solids, solvent and gas upwardly through said pipes and around between said pipes of each section;

a solvent outlet in said head;

respective overflows connecting each upper section with the next lower section and the lowermost section with said chamber;

a solids outlet formed in the bottom of said chamber;

a solvent inlet opening into said chamber; and a steam inlet opening into a float-controlled valve connected to said chamber for controlling the level of material therein to maintain a steam-gas layer in said chamber below the nozzles of said lowermost section.

2. The extractor defined in claim 1 wherein said pipes are of circular cross section.

3. The extractor defined in claim 2 wherein said pipes are of rectangular cross section.

* * * * *